United States Patent [19]

Bradley et al.

[11] Patent Number: 4,491,272

[45] Date of Patent: Jan. 1, 1985

[54] PRESSURE ATOMIZING FUEL INJECTION ASSEMBLY

[75] Inventors: Jerome R. Bradley, Sterling Heights; Robert M. Halvorsen, Birmingham; Jeffrey B. Hurst, Troy; Gregory F. Long, Canton, all of Mich.

[73] Assignee: Ex-Cell-O Corporation, Troy, Mich.

[21] Appl. No.: 461,407

[22] Filed: Jan. 27, 1983

[51] Int. Cl.³ .............................................. F02C 7/22
[52] U.S. Cl. .......................................... 239/5; 60/742; 60/748; 239/104; 239/132.5; 239/402; 239/416.2
[58] Field of Search ....................... 239/5, 11, 13, 104, 239/132.5, 402, 404, 406–408, 410, 416.2, 416.4, 416.5, 417.5, 533.2–533.12, 574, 575, 584; 60/735, 737, 740–742, 748

[56] References Cited

U.S. PATENT DOCUMENTS

| | | | |
|---|---|---|---|
| 2,954,172 | 9/1960 | Grundman | 239/533.6 X |
| 3,022,954 | 2/1962 | Davies et al. | 239/584 X |
| 3,154,095 | 10/1964 | Cleminshaw et al. | 60/742 X |
| 3,443,760 | 5/1969 | Simmons | 239/410 |
| 3,662,959 | 5/1972 | Sample, Jr. | 239/533.2 |
| 3,727,636 | 4/1973 | Simmons | 239/410 X |

OTHER PUBLICATIONS

"Force Augmentation for Relief Valve", NASA Tech Briefs, Fall/Winter 1981, p. 329.

*Primary Examiner*—Andres Kashnikow
*Attorney, Agent, or Firm*—Edward J. Timmer

[57] ABSTRACT

A pressure atomizing fuel nozzle assembly for a gas turbine engine includes a support housing in which a pressure-responsive fuel check valve and metering valve are disposed in line to provide a flow of primary fuel for engine start-up and low power operation and secondary fuel for higher power operation. The check valve is located upstream between the fuel inlet and a sleeve inside of which the metering valve is disposed. The check valve prevents the fuel manifold from draining after engine shut-down and controls fuel entry to both the secondary fuel chamber within the sleeve and to an annular primary fuel chamber between the sleeve and support housing connected in fuel flow relation to the secondary chamber by a fuel filter. The primary fuel flows through the primary chamber around the exterior of the secondary chamber and through an annular primary fuel conduit disposed around the secondary fuel conduit in the housing strut to the nozzle attached to the strut. The secondary fuel flow is controlled by the downstream metering valve in the sleeve and flows interiorly of the primary fuel to the nozzle. In this way, the secondary fuel flow path is subjected to a cooling action by the primary fuel as it flows to the nozzle. The check valve is configured to provide a high closing force and to cause the secondary fuel to exert a washing action on the fuel filter incorporated into the sleeve under high power engine operation conditions.

37 Claims, 3 Drawing Figures

PRESSURE ATOMIZING FUEL INJECTION ASSEMBLY

FIELD OF THE INVENTION

The present invention relates to fuel nozzle means for gas turbine engines and, in particular, to a pressure atomizing fuel nozzle assembly and fuel supply method.

BACKGROUND OF THE INVENTION

Pressure atomizing fuel nozzle assemblies have been and are used in gas turbine engines. Typically, the nozzle assembly includes an inlet fitting connected to a fuel manifold providing pressurized fuel from a suitable fuel pump. The fuel nozzle assembly is constructed to provide a so-called primary fuel flow for engine start-up and low power operation and a secondary fuel flow for higher power engine requirements. In the past, the primary fuel flow has been controlled by a simple check valve which opens when fuel pressure exceeds a certain relatively low value and remains open during engine operation to supply fuel to the nozzle attached to the assembly. The secondary fuel flow has been controlled by a so-called metering valve which is also pressure-responsive and is designed to open and meter fuel starting at another fuel pressure higher than that opening the check valve. The metering valve supplies additional fuel to the nozzle in preselected relation to changes in fuel pressure.

A pressure atomizing fuel nozzle assembly used in the past includes a secondary fuel metering valve in a main support housing to meter secondary fuel flow to a feed conduit extending through a support strut to a nozzle mounted on the strut. The primary fuel check valve is of the in-line type having a valve head supported atop a relatively small coil spring located in a lateral extension of the support housing. The check valve opens in response to a certain fuel pressure to supply primary fuel to a feed conduit extending through the support strut to the nozzle on the inside of the feed conduit carrying secondary fuel and concentric therewith. In operation, fuel flows into the main support housing upstream of the secondary fuel metering valve and also upstream of the check valve via a bypass to the lateral housing extension. The check valve is operable to admit fuel to the primary fuel passage bypassing the secondary fuel metering valve when fuel pressure reaches a given relatively low value and the secondary fuel metering valve is operable at the higher fuel pressure to admit and meter fuel to the secondary fuel passage located exteriorly of the primary fuel passage in the strut.

Such a fuel nozzle assembly may suffer from certain problems in operation and maintenance under the gas turbine engine conditions to which it will be exposed. For example, a "sticking" problem could be experienced by the primary fuel check valve because of its low spring closing force dictated by its small size, causing fuel leakage and drainage from the fuel manifold past the valve. The check valve controls only the primary fuel flow and there is no means in the nozzle assembly for controlling fuel flow from the inlet to the secondary fuel metering valve. Thus, fuel in the fuel manifold may leak directly past the metering valve if proper sealing action is not achieved. The secondary fuel feed conduit could experience coking as a result of compressor discharge air temperatures heating the secondary fuel flowing through the support strut on the outside of the primary fuel flow. Due to the secondary fuel conduit being concentric around the exterior of the primary fuel conduit and having relatively small passages in a series of standoffs therebetween, unwanted pressure drops may occur in the secondary fuel conduit. Furthermore, there is no provision in the fuel nozzle assembly for washing the fuel filter through which the primary fuel flows to the check valve, and dirt and foreign matter thus may be bothersome. And, no provision is made for providing a cooling action to the support housing and secondary fuel therein against engine heat.

SUMMARY OF THE INVENTION

It is an object of the present invention to provide a pressure atomizing fuel nozzle assembly for a gas turbine engine which includes a support housing means in which a check valve is disposed upstream from the metering valve preferably in alignment therewith to control the flow of fuel to both a primary fuel chamber and secondary fuel chamber in the assembly and in which a greater spring force can be provided for the check valve.

It is another object of the invention to provide such a pressure atomizing fuel nozzle assembly in which the check valve is so located and configured to cause fuel to exert a washing action on the fuel filter when the engine is operated at high power.

It is still another object of the invention to provide such a pressure atomizing fuel nozzle assembly in which assembly components are arranged to provide the primary fuel flow path on the exterior of the secondary fuel flow path to provide a cooling action for the secondary fuel path not only in the housing strut containing the fuel conduits but also in the support housing containing the check valve and metering valve.

It is yet another object of the invention to provide a means between the inner secondary fuel conduit and outer primary fuel conduit to cause the primary fuel to swirl or rotate around the secondary fuel conduit to optimize the cooling effect thereon.

It is still another object of the invention to provide such an arrangement of assembly components which reduces fuel pressure drops during fuel flow to the nozzle in addition to providing the aforementioned secondary fuel flow path cooling advantages.

Briefly, the fuel nozzle assembly of the invention comprises a housing means having fuel inlet means adapted to receive pressurized fuel from a suitable fuel source and means in the housing means providing a secondary fuel chamber and primary fuel chamber downstream of the fuel inlet means to receive fuel therefrom. In the housing means between the fuel inlet means and secondary and primary fuel chambers is a first valve means, preferably a check valve means, operable in response to a given fuel pressure to admit fuel from the fuel inlet means to the chambers. A second valve means, preferably a metering valve means, is disposed in the housing means, preferably in the secondary fuel chamber, downstream of the first valve means preferably in line therewith and is operable in response to fuel pressure higher than the given fuel pressure to allow fuel flow from the secondary fuel chamber to a secondary fuel outlet means provided in the housing means. A primary fuel outlet means in the housing means receives fuel from the primary fuel chamber. Nozzle means on the housing means receives the primary fuel and secondary fuel and introduces same into the engine.

In a preferred embodiment of the present invention, the fuel nozzle assembly comprises a housing means having a fuel inlet means adjacent one end adapted to receive pressurized fuel from a fuel source, an interior chamber in communication with the fuel inlet means, pressure-responsive check valve means and metering valve means disposed in the interior chamber to provide a flow of primary fuel and secondary fuel, and a fuel outlet means in communication with the interior chamber adjacent the other end and providing a primary fuel outlet means and secondary fuel outlet means to the nozzle means mounted on the housing means.

The check and metering valve arrangement includes a means in the interior chamber, such as a sleeve means disposed in the interior chamber in spaced relation from the housing means, forming an outer annular primary fuel chamber and an inner concentric secondary fuel chamber to receive fuel from the check valve means. The sleeve means preferably includes a fuel filter means connecting the primary and secondary fuel chambers in fuel flow relation upstream adjacent the check valve. The check valve means is disposed in the main chamber between the fuel inlet means and sleeve means and is operable in response to a given fuel pressure to admit fuel to the secondary fuel chamber and to the primary fuel chamber preferably through the fuel filter means. The fuel admitted to the primary fuel chamber flows through the chamber and into primary fuel outlet means feeding the nozzle means primary fuel. The flow of fuel entering the secondary fuel outlet means is controlled by the metering valve means disposed in the secondary fuel chamber downstream from the check valve means, preferably coaxial therewith. The metering valve means meters fuel from the secondary fuel chamber into the secondary fuel outlet means feeding secondary fuel to the nozzle means.

In a particularly preferred embodiment of the invention, the check valve means comprises a poppet valve configured, such as having an inverted T-shaped stem, to cause the fuel flow to traverse along an adjacent inner surface of the fuel filter means to provide a washing action thereof when fuel is flowing to the nozzle means under high engine power conditions.

In another preferred embodiment of the invention, the check valve means is supported between the fuel inlet means and sleeve means by a spring means and the same spring means biases the sleeve means in position in the interior chamber.

In yet another preferred embodiment of the invention, fuel outlet means of the housing means includes a strut portion in which are disposed an outer conduit and a smaller conduit inside the outer conduit to provide an annular primary fuel passage around an inner secondary fuel passage.

In still another preferred embodiment, means such as a helical-like spring or member is disposed between the inner and outer conduits for causing the primary fuel to swirl or rotate around the inner conduit carrying secondary fuel to enhance cooling thereof by the primary fuel.

In yet another preferred embodiment of the invention, the sleeve means comprises an intermediate tubular member inside of which the metering valve means is disposed, a tubular fuel filter element adjacent the upstream end of the intermediate tubular member and a supportive cup-shaped member adjacent the downstream end. The intermediate tubular member and fuel filter element are removable from the main chamber and are supported on the cup-shaped member which is fastened in the housing means.

The fuel supply method of the present invention has objects and advantages analogous to those of the fuel nozzle assembly described hereinabove.

DESCRIPTION OF PREFERRED EMBODIMENTS

Figure 1:
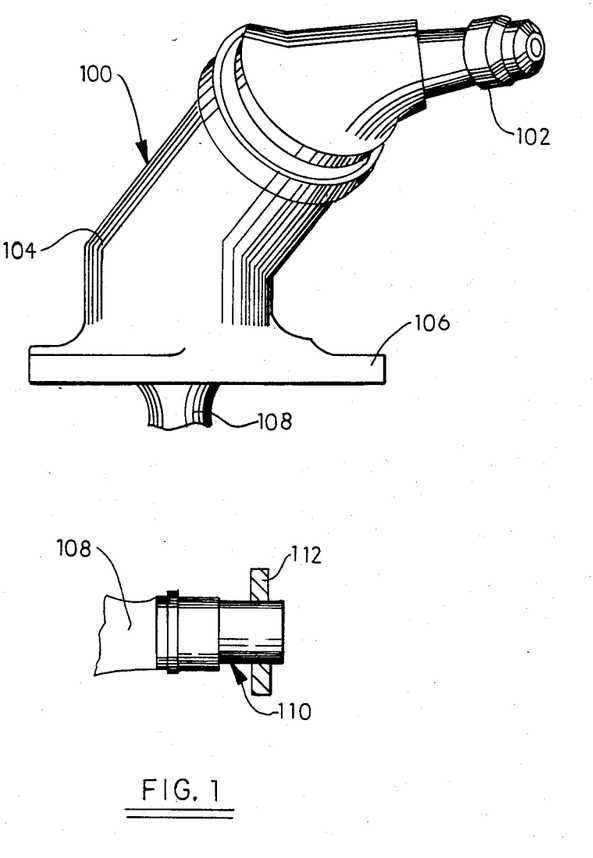
FIG. 1 is a partial elevation of the pressure atomizing fuel nozzle assembly.
Figure 2:
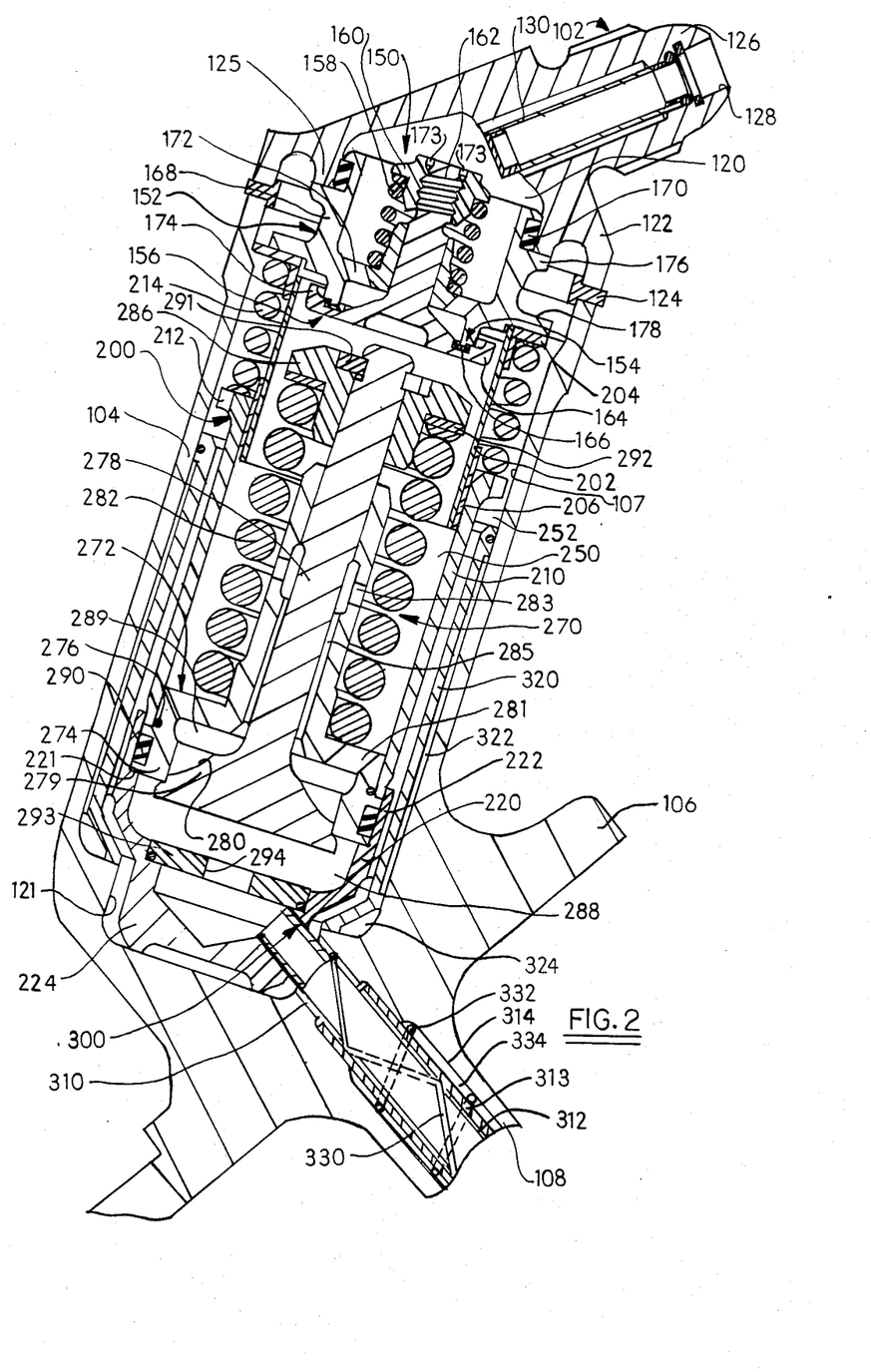
FIG. 2 is a partial longitudinal cross-sectional view through the assembly showing the support housing, valve means and a portion of the support strut.
Figure 3:
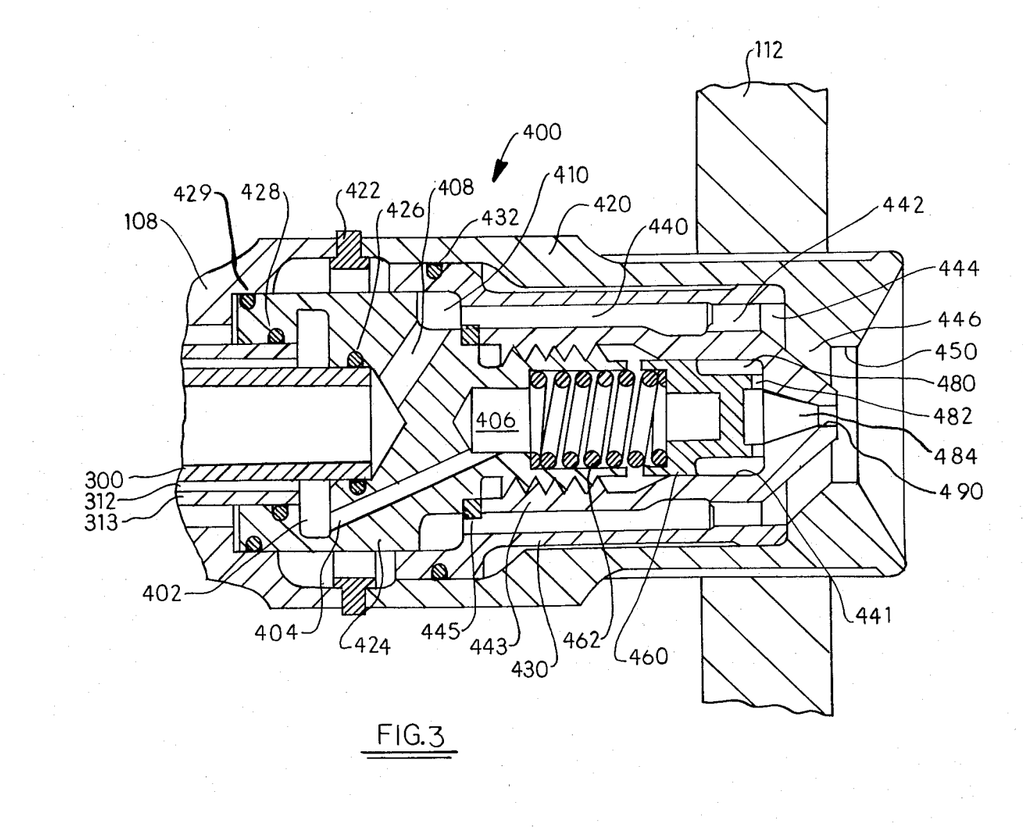
FIG. 3 is a partial longitudinal cross-sectional view through the nozzle means and a portion of the support strut.

FIGS. 1-3 illustrate a pressure atomizing fuel nozzle assembly constructed in accordance with a preferred embodiment of the invention. As shown in FIG. 1, the assembly includes a support housing 100 comprised of a fuel inlet fitting 102, valve housing 104, mounting flange 106 and support strut 108, and a nozzle 110 mounted on the strut 108. As is well known, the inlet fitting 102 is adapted to fit with a suitable outlet fitting on a fuel manifold (not shown) receiving pressurized fuel from a suitable fuel pump and flange 106 is adapted for mounting on a duct wall (not shown) carrying compressor discharge air at elevated temperature. As a result, the valve housing 104 and support strut 108 through which primary fuel and secondary fuel streams flow are subjected to substantial heating, the strut of course being heated directly by the compressor discharge air passing over it.

As is also well known, the nozzle 110 is mounted in a combustion chamber wall 112 to atomize and inject the primary and secondary fuel into the combustion chamber.

Referring to FIG. 2, the valve support housing 104 and valve mechanism disposed therein are shown in greater detail. For example, it is apparent that the valve housing 104 includes housing cap 122 welded thereto at 124 with an elongated main interior chamber 120 formed inside the housing and cap. The cap 122 includes an inlet nipple 126 adapted to mate with an outlet fitting on the fuel manifold (not shown) in known manner. A fuel inlet passage 128 is provided with a first cylindrical fuel filter element 130. It is apparent that fuel flows through the passage 128 and fuel filter element 130 into the main chamber 120 which is defined by the valve housing and cap and then to the upstream side of the poppet check valve 150.

The poppet check valve 150 is comprised of a tubular valve liner or support 152 having a seat 154, a valve stem 156 constructed in an inverted T-shape and a coil spring 158 positioned between a retainer 160 which is threadably attached to the shaft 162 of the valve stem and a shoulder on the valve support 152. The stem includes a head 164 with a seat insert 166 to mate and seal with seat 154 of the valve support. The seat 154 includes a depending annular rib as shown to insure proper sealing against seat insert 166.

The valve support 152 includes an upper cylindrical tubular portion 168 forming a fuel receptacle around the valve shaft and coil spring, and an O-ring seal 170 is provided to prevent fuel from by-passing the check valve around its periphery. As is apparent, the shoulder of the valve support on which the coil spring rests includes a plurality of bores 172 through which fuel flows to the valve stem head 164.

The check valve spring 158 is adjusted by threading the retainer 160 onto the shaft 162 the desired extent and tack welding the retainer at 173 to lock it in adjusted position on the shaft so that the valve will open at a preselected fuel pressure corresponding to engine start-up fuel pressure, e.g., 20 psi. The valve will gradually open to a preset limit in response to increased fuel pressure necessary for low power engine operation.

As the fuel flows through the check valve, the head 164, especially the shroud ring 174 thereon, will cause the fuel flow to reverse in direction to provide additional force to open the valve, as explained, for example, in *NASA Tech Briefs*, p. 329, Fall/Winter 1981. In addition, the fuel will be caused to flow in such a manner as to wash adjacent downstream components as will be explained more fully hereinbelow.

The poppet check valve 150 includes annular flanges 176, 178 extending therefrom by which the valve is held and supported in the main chamber 120 of the valve housing by the sleeve means 200 as will be described.

The sleeve means 200 is comprised of several components arranged adjacent and downstream from one another along the length of the main chamber 120. Starting from the upper end of chamber 120 in FIG. 2, the sleeve means includes a tubular fuel filter element 202 comprised of a perforated metal (Type 347 stainless steel) tube. The tubular filter element has welded thereto an L-shaped annular collar 204 at its upper (upstream) end and a reinforcing ring 206 at its lower (downstream) end. It is apparent that annular collar 204 abuts against the annular flange 178 of the valve support 152 and that the reinforcing ring 206 is received within the upstream end of tubular sleeve member 210. The tubular sleeve member 210 has a bell-shaped upper end with a slotted flange 212 extending therefrom as shown. Disposed between the flange 212 and the annular collar 204 of the fuel filter element is a coil spring 214 which biases and supports the check valve 150 against the valve housing. In particular, the annular collar 204 is biased against the annular flange 178 of the valve support 152 and this in turn biases flange 176 against the cap housing shoulder 125. Similarly, the coil spring 214 biases the tubular sleeve member 210 downwardly against supportive downstream sleeve components for positioning purposes.

The downstream end of the tubular sleeve member 210 is supported by a tubular end member 220 having a large diameter tubular portion 222 receiving the downstream end of the tubular sleeve member 210 and having a smaller diameter cup-shaped portion 224 received in small diameter portion 121 of the main chamber 120.

The fuel filter element 202, tubular sleeve member 210 and tubular end member 220 form a secondary fuel chamber 250 inside thereof along their lengths. As fuel flows through the check valve 150, a portion enters the secondary fuel chamber 250 and the other portion flows through the fuel filter element 202 into a primary fuel chamber 252 formed by the space between the sleeve means 200 and valve housing wall 107 which defines main interior chamber 120. The inner secondary fuel chamber 250 and outer annular primary fuel chamber 252 concentric therearound are thus in fuel flow relation at their inlet or upstream ends adjacent the check valve.

Disposed in the secondary fuel chamber 250 is a metering valve 270 which comprises a valve liner or support 272 having a cylindrical portion 274 brazed to the tubular sleeve member 210 at 276. Below the brazed joint 276 the cylindrical portion 274 is supported on a shoulder 221 of the tubular end member 220 of the sleeve means 200. An O-ring 290 is disposed therebetween to prevent fuel from by-passing the metering valve.

The metering valve has a valve stem comprising a stem shaft 278 and slotted stem head 279. The slots 280 are arcuately shaped to meter fuel flowing from the secondary fuel chamber 250 through bores 281 and cross bores 283 and then down central chamber 285 around the stem shaft 278 into chamber 289 above the valve head 279. A coil spring 282 is disposed between the valve housing 274 and a retainer 286 is attached on the stem shaft 278 with a C-ring 291. The spring is selected to allow the metering valve to open at a higher fuel pressure than the start-up and low power fuel pressure, corresponding to operation of the engine at high power conditions, e.g., the valve will open when fuel pressure reaches approximately 140 psi and continue to open via slots 280 to increase fuel flow in prearranged relation with fuel pressure increases. Spring pre-load is adjusted by using annular shim 292 between the retainer 286 and the spring 282.

The secondary fuel flowing through the metering valve 270 is received in a discharge chamber portion 288 of chamber 250 having a plate 293 extending thereacross with a secondary metering port 294. Secondary fuel flows through the port 294 and into the secondary fuel conduit 300 constituting secondary fuel outlet means of the valve housing. The tubular end member 220 of the sleeve means 200 is brazed or otherwise attached to the conduit 300. On the other hand, the fuel filter element 202, tubular sleeve member 210 and coil spring 214 of the sleeve means as well as the check valve 150 are removable from the valve housing 104 in the event the cap 122 is removed by machining away of weldment 124.

As mentioned hereinabove, fuel flowing through the check valve 150 enters the secondary fuel chamber 250 and also primary fuel chamber 252 via the fuel filter element 202. It is apparent that the primary fuel chamber 252 is an annular chamber extending between the housing wall 107 and sleeve means 200 downstream from the check valve 150. The annular primary fuel chamber thus surrounds the secondary fuel chamber downstream from the check valve and primary fuel flow therethrough exerts a cooling action on the secondary fuel flow interiorly thereof. The primary fuel chamber 252 extends from the fuel filter element 200 past the tubular sleeve member 210 and along the tubular end member 220 wherein it is in communication with a primary fuel outlet passage 310 in the valve housing 104 constituting the primary fuel outlet means thereof. The cross-section of the primary fuel chamber 252 is reduced in the vicinity of the tubular sleeve member 210 and tubular end member 220 by an insulating sleeve 320 brazed to the housing wall 107 to provide insulation spaces 322 and 324 to further reduce heat transfer to the fuel flow from the heated compressor discharge air. The insulating sleeve 320 is considered part of the valve housing 104 for this reason.

As mentioned, secondary fuel flows from the metering valve 270 into the conduit 300 constituting the secondary fuel outlet means. The primary fuel flows from the primary chamber 252 into the annular passage 310 on the outside of secondary fuel conduit 300 and then into annular passage 312 defined between inner secondary fuel conduit 300 and outer primary fuel conduit 313 received in a larger diameter passage 314 in the valve housing 104 and strut 108.

Disposed in the annular primary fuel passage 312 is a helical-like spring or other member 330 whose function is to cause the primary fuel to swirl or rotate around the inner conduit 300 to enhance cooling of the secondary fuel flowing through conduit 300. The member 330 also functions as a spacer to maintain the proper size for the annular primary fuel passage 312. A helical spacer or spring 332 is also located in insulating chamber 334 formed by larger diameter passage 314.

Referring to FIG. 3, the primary fuel in annular passage 312 between inner conduit 300 and outer conduit 313 flows into nozzle 400, in particular into annular primary fuel-receiving chamber 402 and then through a plurality of cross-bores 404 into central primary fuel chamber 406. From chamber 406, the primary fuel flows through a cross-slot (not shown in FIG. 3) in primary insert 460 to annular chamber 480. The secondary fuel in conduit 300 flows through a plurality of cross-bores 408 (only one shown) and into annular secondary fuel-receiving chamber 410.

The nozzle 400 includes an outer nozzle body 420 welded at 422 to the strut 108. A first nozzle insert 424 is brazed at 426 and 428 to the inner conduit 300 and outer conduit 313, respectively, and at 429 to the strut 108. The insert 424 includes primary fuel receiving chamber 402, primary fuel cross bore 404 and primary fuel chamber 406 as well as secondary fuel receiving chamber 410 and secondary cross-bores 408. A nozzle insulator sleeve 430 is brazed at 432 to the outer nozzle body 420. The insulator sleeve 430 provides annular secondary fuel passages 440, 442, 444 and 446 through which secondary fuel flows and is emitted past lip 450 on the outer nozzle body 420 as a fuel spray cone. Passages 442 are inclined at an angle relative to the longitudinal axis of the nozzle 400 to function as fuel swirl passages.

A third nozzle insert 460 and positioning spring 462 are positioned in primary fuel chamber 406 and in the bore 441 of a second insert 443. Second insert 443 is welded at 445 to first insert 424 and also is threadably connected thereto as shown. Primary fuel flows from chamber 406 through annular chamber 480, tangential swirl slots 482 and into conical fuel swirl chamber 484 for discharge past lip 490 on the second nozzle insert 443 in the form of a fuel spray cone emitted inside the secondary fuel spray cone. Both fuel spray cones are atomized as they flow past lips 450 and 490 into the combustion chamber.

In operation in accordance with the fuel supply method of the invention, fuel flows through passage 128 in the inlet fitting, through fuel filter 130 into chamber 120 upstream above the check valve 150. The function of the check valve is to prevent fuel from draining from the manifold and to keep the manifold full for fast response during engine operation. The fuel flows through the check valve when the fuel pressure reaches a given pressure value and passes past the valve head 164. As mentioned, the valve head 164 is configured so as to cause the fuel to pass over the shroud ring 174 and then flow axially along the adjacent inner axial face of the fuel filter element 202. When secondary fuel is being used by the engine under high power conditions, this flowing of the fuel over the filter face provides a washing action to remove dirt or debris which may have accumulated there.

So long as the metering valve 270 remains closed, the fuel entering the secondary fuel chamber 250 flows through the fuel filter element 202 into the primary chamber 252 for eventual discharge through the annular passage 310 and 312. When fuel pressure rises to a selected higher value than the given pressure value indicating a higher engine power condition, the metering valve begins to open and fuel in the secondary chamber 250 is metered into discharge chamber 288 and then flows through inner conduit 300 while primary fuel flow through chamber 252 and passages 310 and 312 continues. Importantly, downstream from the check valve, the secondary fuel always flows interiorly of the primary fuel so that the latter can cool and shield the former from engine heat, regardless of the rate of flow of secondary fuel to the nozzle. Further, the primary fuel flow also exerts a cooling effect on the valve housing 104 as will be apparent. Since primary fuel is always flowing during engine operation, continuous protection of the secondary fuel flow path is provided during operation in accordance with the fuel supply method of the invention. The swirling or rotating action of the primary fuel in passages 310 and 312 enhances cooling effects on the secondary fuel flow path.

While the nozzle assembly and fuel supply method of the invention have been described by a detailed description of certain specific and preferred embodiments, it is understood that various modifications and changes can be made in any of them within the scope of the appended claims which are intended to also include equivalents of such embodiments.

We claim:

1. A fuel nozzle assembly for a gas turbine engine comprising a housing means having fuel inlet means adapted to receive pressurized fuel from a fuel source, means in the housing means providing a secondary fuel chamber and primary fuel chamber downstream of said inlet means for receiving fuel therefrom, a first valve means in the housing means between the fuel inlet means and fuel chamber-providing means operable in response to a given fuel pressure to admit fuel from said inlet means to said secondary fuel chamber and primary fuel chamber, a second valve means in the housing means downstream of said first valve means operable in response to fuel pressure higher than said given fuel pressure to allow fuel flow from the secondary fuel chamber, secondary fuel outlet means in the housing means for receiving fuel from the secondary fuel chamber as allowed by the second valve means, primary fuel outlet means in the housing means for receiving fuel from the primary fuel chamber, and nozzle means on the housing means for receiving primary fuel and secondary fuel from the respective fuel outlet means and introducing same into the engine for combustion.

2. A fuel nozzle assembly for a gas turbine engine comprising a housing means having fuel inlet means adapted to receive pressurized fuel from a fuel source, means in the housing means providing a secondary fuel chamber and primary fuel chamber downstream from said inlet means for receiving fuel therefrom, a first valve means in the housing means between the fuel inlet means and fuel chamber-providing means operable in response to a given fuel pressure to admit fuel from said inlet means to said secondary fuel chamber and primary fuel chamber, a second valve means in the secondary fuel chamber operable in response to fuel pressure higher than said given fuel pressure to allow fuel flow therefrom, secondary fuel outlet means in the housing means for receiving fuel from the secondary fuel chamber as allowed by the second valve means, primary fuel outlet means in the housing means for receiving fuel from the primary fuel chamber, and nozzle means on the housing means for receiving primary fuel and secondary fuel from the respective fuel outlet means and introducing same into the engine for combustion.

3. The fuel nozzle assembly of claim 2 wherein the secondary fuel chamber is located interiorly of the primary fuel chamber in the housing means.

4. The fuel nozzle assembly of claim 3 wherein the secondary fuel outlet means is located interiorly of the primary fuel outlet means in the housing means.

5. The fuel nozzle assembly of claim 4 wherein a means is located in the primary fuel outlet means to cause the primary fuel to swirl or rotate around the secondary fuel as the primary fuel flows to the nozzle means.

6. The fuel nozzle assembly of claim 2 wherein the fuel-chamber-providing means includes a fuel filter means upstream adjacent the first valve means connecting the secondary fuel chamber and primary fuel chamber in fuel flow relation.

7. The fuel nozzle assembly of claim 6 wherein the first valve means is configured to cause fuel flow from the inlet means to provide a washing action of the fuel filter means.

8. A fuel nozzle assembly for a gas turbine engine, comprising a housing means having fuel inlet means adapted to receive pressurized fuel from a fuel source, an interior chamber in communication with the fuel inlet means, and fuel outlet means in communication with the interior chamber providing a primary fuel outlet means and a secondary fuel outlet means, a pressure-responsive valve means disposed in the interior chamber to provide a flow of primary fuel for engine start-up and low power operation and a flow of secondary fuel for higher power operation, said valve means comprising a means in said interior chamber providing an inner secondary fuel chamber and an outer annular primary fuel chamber therearound for receiving fuel from the fuel inlet means and discharging fuel to the respective fuel outlet means, a check valve means disposed in said interior chamber between said inlet means and said chamber-forming means and operable in response to a given fuel pressure to admit fuel from said inlet means into said secondary fuel chamber and primary fuel chamber and a metering valve means disposed in the secondary fuel chamber operable in response to fuel pressure higher than said given fuel pressure to meter fuel from the secondary fuel chamber to the secondary fuel outlet means, and comprising nozzle means comprising nozzle means on said housing means for receiving the primary fuel flow and secondary fuel flow from the respective fuel outlet means and introducing same into the engine for combustion.

9. The assembly of claim 8 wherein the primary fuel outlet means and secondary fuel outlet means comprise an outer conduit means and inner conduit means, respectively, said secondary fuel being carried in said inner conduit means and said primary fuel being carried in the space between the inner and outer conduit means.

10. The assembly of claim 9 wherein a means is located in the space between the inner and outer conduit means to cause the primary fuel to swirl or rotate around the inner conduit means as the primary fuel flows to the nozzle means.

11. A fuel nozzle assembly for a gas turbine engine wherein the assembly is subjected to elevated temperature, comprising a housing means having fuel inlet means adapted to receive pressurized fuel from a fuel source, an interior chamber in communication with the fuel inlet means, and fuel outlet means in communication with the interior chamber providing a primary fuel outlet means and a secondary fuel outlet means, a pressure-responsive valve means disposed in the interior chamber to provide a flow of primary fuel for engine start-up and low power operation and a flow of secondary fuel for higher power operation, said valve means including a check valve means disposed in the interior chamber downstream from the fuel inlet means and operable in response to a given fuel pressure to allow fuel to flow downstream from said fuel inlet means, a sleeve means disposed in said interior chamber in spaced relation from the housing means to form an outer annular primary fuel chamber therebetween and a secondary fuel chamber in said sleeve means for receiving fuel from said check valve means and discharging fuel to the respective fuel outlet means and a metering valve means disposed in the secondary fuel chamber and operable in response to fuel pressure higher than said given fuel pressure to meter fuel from the secondary fuel chamber to the secondary fuel outlet means, and comprising nozzle means supported on said housing means for receiving the primary fuel flow and secondary fuel flow from the respective fuel outlet means and introducing same into the engine for combustion, said primary fuel flow through the primary fuel chamber around the secondary fuel chamber providing a cooling action to said housing means and secondary fuel.

12. The assembly of claim 11 wherein the primary fuel outlet means and secondary fuel outlet means comprise an outer conduit means and inner conduit means, respectively, said secondary fuel being carried in said inner conduit means and said primary fuel being carried in the space between the conduit means so that the primary fuel provides a cooling action to the secondary fuel between said housing means and nozzle means.

13. The assembly of claim 12 wherein a means is located between the conduit means to cause the primary fuel to swirl or rotate around inner conduit means as the primary fuel flows to the nozzle means.

14. The assembly of claim 11 wherein the sleeve means includes an upstream fuel filter means adjacent the check valve means connecting the outer primary fuel chamber and inner secondary fuel chamber in fuel flow relation.

15. The assembly of claim 14 wherein the check valve means is configured to cause the fuel flow to provide a washing action of the fuel filter means.

16. The assembly of claim 14 wherein a spring means is disposed around the fuel filter means between the check valve means and sleeve means to bias them in position in the interior chamber.

17. A fuel nozzle assembly for a gas turbine engine wherein the assembly is subjected to elevated temperature, comprising a housing means having fuel inlet means adapted to receive pressurized fuel from a fuel source, an interior chamber in communication with the fuel inlet means and a fuel outlet means in communication with said interior chamber providing a primary fuel outlet means and secondary fuel outlet means, fuel pressure-responsive valve means disposed in said interior chamber to provide a flow of primary fuel for engine start-up and low power operation and secondary fuel for higher power operation, and comprising a nozzle means on said housing means for receiving the primary fuel flow and secondary fuel flow from the respective fuel outlet means and introducing same in the engine for combustion, said pressure-responsive valve means comprising (a) a sleeve means disposed in said interior chamber in spaced relation from the housing means to define an outer annular primary fuel chamber therebetween and an inner secondary fuel chamber in said sleeve means and having fuel filter means connecting the first and second chambers in upstream fuel flow relation, said secondary fuel chamber and primary fuel chamber receiving fuel upstream from the inlet means and discharging fuel downstream to the respective fuel outlet means, (b) a check valve means disposed in said interior chamber between said inlet means and sleeve means and operable in response to a given fuel fuel pressure to admit fuel from said inlet means to said secondary fuel chamber and to said primary fuel chamber through said fuel filter means for passage through the primary fuel outlet means to said nozzle means, and (c) a metering valve means supported in said secondary fuel chamber by said sleeve means downstream of said check valve means and operable in response to a fuel pressure higher than said given fuel pressure to meter fuel from the secondary fuel chamber through the secondary fuel outlet means to the nozzle means, said primary fuel flow through the primary fuel chamber around the secondary fuel chamber providing a cooling action to said housing means and secondary fuel during engine operation.

18. The assembly of claim 17 wherein the sleeve means comprises an intermediate tubular member in which the metering valve means is supported, a fuel filter means disposed upstream between the check valve means and the intermediate tubular member and a tubular end member adjacent the downstream end of the intermediate tubular member and supporting same in the main chamber of the housing means.

19. The assembly of claim 18 wherein the check valve means is disposed between the fuel filter means and the fuel inlet means of the housing means.

20. The assembly of claim 18 wherein the tubular end member includes an aperture means in fuel flow relation with the secondary fuel outlet means.

21. The assembly of claim 18 wherein a spring means is disposed around the fuel filter means between the sleeve means and check valve means to bias them in position.

22. The assembly of claim 18 wherein the check valve means is configured to cause the fuel entering the secondary fuel chamber to wash the fuel filter means.

23. The assembly of claim 22 wherein the check valve means is a poppet valve means with an inverted T-shaped stem.

24. The assembly of claim 17 wherein the fuel outlet means comprises a first inner conduit and second outer conduit in a strut extending from the housing means to the nozzle means, said second conduit being in fuel flow relation at one end with the secondary fuel outlet means and at the other end with said nozzle means to supply secondary fuel thereto, said first conduit and second conduit defining an annular passage therebetween in fuel flow relation at one end with the primary fuel outlet means and at the other with the nozzle means to supply primary fuel thereto so that primary fuel flow through said annular passages provides a cooling action on the secondary fuel flow between said housing means and nozzle means.

25. The assembly of claim 24 wherein means is disposed in the annular passage to cause primary fuel flowing therethrough to swirl or rotate around the inner conduit as the primary fuel flows to the nozzle means.

26. A fuel nozzle assembly for a gas turbine engine wherein the assembly is subjected to elevated temperatures, comprising a housing means having fuel inlet means adapted to receive pressurized fuel from a fuel source, an interior chamber in communication with the inlet means, and a fuel outlet means in communication with said interior chamber providing a primary fuel outlet means and secondary fuel outlet means, fuel pressure-responsive valve means disposed in said interior chamber to provide a flow of primary fuel for engine start-up and low power operation and secondary fuel for higher power operation and comprising a nozzle means supported on said housing means for receiving the primary fuel flow and secondary fuel flow from the respective fuel outlet means and injecting same into the engine for combustion, said pressure-responsive valve means comprising (a) a check valve means disposed in the interior chamber downstream from the fuel inlet means and operable in response to a given fuel pressure to allow fuel to flow downstream from said fuel inlet means, (b) a tubular sleeve means disposed in the interior chamber downstream from the check valve means and in spaced relation from the housing means so as to define an outer annular primary fuel chamber therebetween and an inner secondary fuel chamber in the sleeve means to receive fuel from the check valve means, said sleeve means including a tubular fuel filter means downstream from the check valve means adjacent thereto connecting the secondary fuel chamber in fuel flow relation with the primary fuel chamber, an intermediate tubular member downstream from and receiving the fuel filter means, and a tubular end member downstream from the intermediate tubular member in supporting relation thereto to support the intermediate tubular member in the housing means such that the tubular fuel filter, tubular member and tubular end member together define the secondary fuel chamber therewithin, said tubular end member having a first aperture means in fuel flow relation with the secondary fuel outlet means extending to the nozzle means and said primary fuel chamber being in fuel flow relation with the primary fuel outlet means extending to the nozzle means, (c) a spring means disposed around the fuel filter means between the check valve means and intermediate tubular member to bias same in position in the housing means, (d) a metering valve means supported in the secondary fuel chamber by said tubular sleeve means and operable in response to a fuel pressure higher than said given fuel pressure to meter fuel from the secondary fuel chamber through the secondary fuel outlet means to the nozzle means.

27. The assembly of claim 26 wherein the check valve means comprises a poppet valve having an inverted T-shaped stem which directs fuel flow along the tubular fuel filter means to wash same.

28. The assembly of claim 26 wherein the secondary fuel outlet means comprises a first conduit received in the first aperture means of the tubular end member and extending to the nozzle means to carry secondary fuel thereto and wherein the primary fuel outlet means comprises a second larger diameter conduit disposed around the first conduit and in fuel flow relation with said primary fuel chamber, said conduits defining an annular primary fuel passage therebetween around the secondary fuel tube extending to the nozzle means to carry primary fuel thereto, thereby providing a cooling action to said secondary fuel between the housing means and nozzle means.

29. The assembly of claim 28 wherein a helical-like member is disposed in the annular passage to cause the primary fuel to swirl or rotate around the secondary fuel conduit as the primary fuel flows to the nozzle means.

30. In the operation of a gas turbine engine, a method for supplying fuel to a nozzle means in the engine comprising, flowing fuel to a first valve means located upstream of the nozzle means and operable in response to a given fuel pressure to admit fuel to a secondary fuel chamber and a primary fuel chamber, pressurizing the fuel to said given fuel pressure to flow fuel through the first valve means into the secondary fuel chamber and primary fuel chamber, including conducting the fuel in the primary fuel chamber to the nozzle means and conducting fuel in the secondary fuel chamber to a second valve means upstream of the nozzle means and operable in response to a fuel pressure higher than said given fuel pressure to allow fuel flow to the nozzle means from the secondary fuel chamber, and pressurizing the fuel to said fuel pressure higher than said given fuel pressure as needed to provide secondary fuel to the nozzle means for desired engine operation.

31. In the operation of a gas turbine engine, a method for supplying primary fuel and secondary fuel to a nozzle means supported on a housing means in the engine comprising, flowing fuel to a check valve means located upstream of the nozzle means and operable in response to a given fuel pressure to admit fuel to an inner secondary fuel chamber and an outer primary fuel chamber, pressurizing the fuel to said given fuel pressure to flow the fuel through the check valve means into the secondary fuel chamber and primary fuel chamber, including conducting the fuel in the primary fuel chamber to the nozzle means through the housing means and conducting the fuel in the secondary fuel chamber to a metering valve means upstream of the nozzle means and operable in response to a fuel pressure higher than said given fuel pressure to meter fuel to the nozzle means through the housing means interiorly of the primary fuel flow to the nozzle means, and pressurizing the fuel to said fuel pressure higher than said given fuel pressure as needed to provide secondary fuel to the nozzle means in addition to primary fuel for desired engine operation.

32. The method of claim 31 wherein the fuel flows through the check valve means into the secondary fuel chamber first and then into the primary fuel chamber.

33. The method of claim 32 wherein the fuel is filtered as it flows from the secondary fuel chamber into the primary fuel chamber by filter means therebetween.

34. The method of claim 33 wherein the fuel is caused to flow through the check valve means in such a manner as to wash the fuel filter means when secondary fuel is flowing to the nozzle means.

35. The fuel nozzle assembly of claim 1 wherein the first valve means and second valve means are coaxially aligned.

36. The fuel nozzle assembly of claim 2 wherein the first valve means and second valve means are coaxially aligned.

37. The fuel nozzle assembly of claim 8 wherein the check valve means and metering valve means are coaxially aligned.

* * * * *